United States Patent [19]

Statz

[11] Patent Number: 4,766,174
[45] Date of Patent: Aug. 23, 1988

[54] PROCESS FOR PREPARING MELT-PROCESSIBLE ALUMINUM IONOMER BLENDS

[75] Inventor: Robert J. Statz, Kennett Square, Pa.

[73] Assignee: E. I. Du Pont de Nemours and Company, Wilmington, Del.

[21] Appl. No.: 815,599

[22] Filed: Jan. 2, 1986

[51] Int. Cl.[4] .............................................. C08L 33/02
[52] U.S. Cl. .................................... 525/64; 525/66; 525/71; 525/78; 525/93; 525/131; 525/173; 525/176; 525/183; 525/195; 525/196; 525/919
[58] Field of Search ............. 525/195, 196, 919, 78, 525/183, 66, 71, 93, 176, 64, 173, 131

[56] References Cited

U.S. PATENT DOCUMENTS

| | | | | |
|---|---|---|---|---|
| 3,264,272 | 8/1966 | Rees | ...................... | 260/78.5 |
| 3,437,718 | 4/1969 | Watkin | ...................... | 525/195 |
| 3,454,676 | 7/1969 | Busse | ...................... | 525/196 |
| 3,792,124 | 2/1974 | Davison | ...................... | 525/93 |
| 3,940,146 | 2/1976 | Little | ...................... | 273/235 R |
| 4,083,824 | 4/1978 | Harris | ...................... | 260/42.29 |
| 4,187,358 | 2/1980 | Kyo et al. | ...................... | 525/132 |
| 4,310,638 | 1/1982 | Coran | ...................... | 525/183 |
| 4,327,199 | 4/1982 | Coran | ...................... | 525/176 |
| 4,337,947 | 7/1982 | Saito | ...................... | 525/176 |

FOREIGN PATENT DOCUMENTS 0170790 2/1980 European Pat. Off. .
56-55442 5/1981 Japan .

*Primary Examiner*—Patricia Short

[57] ABSTRACT

Melt-processible blends of aluminum ionomers of ethylene/unsaturated carboxylic acid copolymers and thermoplastic resins or elastomers are obtained by mixing the ethylene/acid copolymer and the thermoplastic resin or elastomer and simultaneously or subsequently neutralizing from about 1 to about 100% of the carboxylic acid groups of the ethylene copolymer with aluminum ions.

19 Claims, No Drawings

PROCESS FOR PREPARING MELT-PROCESSIBLE ALUMINUM IONOMER BLENDS

BACKGROUND OF THE INVENTION

1. Field of the Invention

This invention relates to aluminum ionomers and more particularly it relates to melt processible aluminum ionomer blends.

2. Description of the Prior Art

Aluminum ionomer blends are useful where sodium or zinc ionomers cannot be used because of their temperature limitations. Sodium and zinc ionomers of ethylenically unsaturated carboxylic acid copolymers have no resistance to compression set at 70° C. and at 70°–100° C. they loose all of their physical strength. Unlike these ionomers, aluminum ionomers maintain useful physical properties above 100° C. However, neat aluminum ionomers are not melt processible using standard thermoplastic processing techniques, such as injection molding or extrusion.

Japanese Patent Publication No. 56-55442 discloses a resin composition having improved properties comprising an ionically crosslinked copolymer of ethylene and alpha,beta-ethylenically unsaturated carboxylic acid, partially or completely ionically crosslinked by metal ion optionally an alpha,beta-unsaturated ester, and a polyamide resin having a melting point of not more than 160° C. Ten mole percent or more of the alpha,beta-unsaturated carboxylic acid component is disclosed to be substituted by $Na^+$, $Mg^{2+}$, $Zn^{2+}$, $Al^{3+}$, and the like. It is disclosed that the resin composition "can be prepared by a known blending method; the composition is processed into a powder, chips, pellets, or the like form followed by feeding to an extruder, injection molder, compression molding machine or the like to form films, sheets, tubes, molded articles, or the like." It is further taught that "It is permissible to directly feed to the above molding equipment the ionically crosslinked copolymer together with the polyamide resin in the form of a powder, chips, pellets, or the like." The examples disclose ionomers neutralized with magnesium, zinc and sodium ions.

U.S. Pat. No. 4,187,358 discloses a resin composition of (1) an aromatic copolyester derived from (a) a mixture of terephthalic and isophthalic acid and (b) a bisphenol, (2) a polyamide, and (3) an ionomer.

The ionomer is disclosed to be a base copolymer and the product obtained by reacting the base copolymer with a metal compound capable of ionizing the copolymer. The base copolymer is an alpha-olefin/alpha, beta-unsaturated carboxylic acid copolymer e.g., ethylene/acrylic acid copolymer, ethylene/methacrylic acid copolymer, ethylene/itaconic acid copolymer, ethylene/maleic acid copolymer, ethylene/methacrylic acid/vinyl acetate copolymer, ethylene/acrylic acid/vinyl alcohol copolymer, etc. As the metallic ion suitable for neutralizing the carboxylic acid group of the base copolymer metal ions of the groups IA, IB, IIA, IIB, and IIIA of the periodic Table are disclosed to be preferable, the metallic ions having an aromatic valence of 1 to 3 (e.g. $Na^+$, $K^+$, $Li^+$, $Cu^{2+}$, $Be^{2+}$, $Zn^{2+}$ and $Al^{3+}$). The ionomer can be produced by reacting the base copolymer with a formate, acetate, hydroxide, methoxide, carbonate, etc. of the above metals. It is also disclosed that acidic olefinic copolymers that are not reacted with metallic ion can also be used. These are obtained by mixing the acidic olefinic copolymer with polyamide and the specified aromatic copolyester without adding metallic ion. It is further disclosed that it is also possible to form a resin composition by adding the metallic ion while melt extruding an acidic olefinic copolymer, a polyamide and/or specified aromatic copolyester, thus neutralizing the acidic olefinic copolymer.

The ionomer is disclosed to be a very soft substance with a heat distortion temperature measured by ASTM-D648 (18.6 kg/cm$^2$) of below room temperature.

The examples only disclose ionomers neutralized with zinc and sodium ions.

It is disclosed that the resin composition can be prepared by mixing the three ingredients by any of the known methods e.g. kneading through a kneader or rollers or melt extruding through an extruder or finely pulverizing and mixing in a super mixer and then press-forming or rotational molding. It is further disclosed that the sequence in which the materials are mixed is optional i.e. three ingredients may be mixed at the same time or two of them mixed first and the third ingredient added later. In some cases, in order to obtain improved properties, it is preferable to melt mix the specified aromatic copolyester and polyamide first and mixing the resulting composition with an ionomer in the molten state or melt mixing the ionomer and the polyamide to form a composition and then mixing the resulting composition with the specified aromatic copolyester in the molten state.

SUMMARY OF THE INVENTION

According to the present invention there is provided a process for preparing a melt processible blend of aluminum ionomer and thermoplastic resin or elastomer by (A) mixing at from about 150° to about 300° C.

(a) from about 50 to about 95% by weight of direct or graft copolymer of ethylene, alpha,beta-ethylenically unsaturated carboxylic acid having from 3 to 8 carbon atoms, and softening comonomer selected from the group consisting of vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms, and wherein the ethylene content of the polymer is from about 30 to about 98 weight percent, the carboxylic acid content is from about 1 to about 25 weight percent and the softening comonomer content is from 0 to about 60 weight percent, and (b) from about 5 to about 50% by weight of at least one thermoplastic resin or thermoplastic elastomer selected from the group consisting of polyamide (e.g. nylon 66, nylon 6, nylon 610, nylon 612, nylon 666), polyester (e.g. polyethylene terephthalate, poly tetramethylene glycol terephthalate) polyester ether, block copolymer of aromatic substituted ethylenically unsaturated monomer with diolefin and hydrogenated derivative of said copolymer (e.g. styrene/butadiene block copolymer), polyurethane, and polyolefin resin, and (B) subsequent to or simultaneously with said mixing neutralizing from about 1 to about 100% of the carboxylic acid groups with an aluminum ion source provided, however that when the thermoplastic resin or thermoplastic elastomer is polyamide, polyester, polyester ether or polyurethane the aluminum ion source is selected from the group consisting of (1) chelated aluminum compound and (2) mixture of aluminum alkoxide with aluminum acetylacetonate or with acetylacetone.

DETAILED DESCRIPTION OF THE INVENTION

It was discovered that by blending ethylene/unsaturated carboxylic acid copolymers with selected high melting thermoplastic resins or elastomers and simultaneously or subsequently converting these blends to aluminum ionomers it is possible to obtain blends of Al ionomers with thermoplastic resins and/or thermoplastic elastomers which have resistance to compression set and excellent tensile properties and sag resistance at elevated temperatures. In addition, these aluminum ionomer blends retain the excellent oil and abrasion resistance and the excellent resilience of standard ionomers.

The blends prepared according to the present invention can be used as thermoplastic resins and thermoplastic elastomers in such applications as automotive body side moldings, ski boots, tubing and hydraulic hose jackets.

The blend of the present invention contains an aluminum ionomer and a thermoplastic resin or thermoplastic elastomer.

The aluminum ionomer is derived from direct or graft copolymer of ethylene, alpha,beta-ethylenically unsaturated carboxylic acid and optionally softening comonomer.

The unsaturated carboxylic acid has from 3 to 8 carbon atoms. Such acids are acrylic acid, methacrylic acid, maleic acid, fumaric acid, itaconic acid and half esters of maleic, fumaric and itaconic acids. Preferably the acid is acrylic or methacrylic acid, and most preferably the acid is methacrylic acid.

The softening comonomer is selected from the group consisting of vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms. Accordingly suitable softening comonomers are for example vinyl acetate, methyl acrylate, methyl methacrylate, ethyl acrylate, ethyl methacrylate, butyl acrylate, butyl methacrylate, butyl vinyl ether, and methyl vinyl ether. Preferably the softening comonomer is alkyl acrylate, alkyl methacrylate or alkyl vinyl ether, and most preferably the softening comonomer is butyl acrylate.

The ethylene/acid copolymer contains from about 30 to about 95% by weight of ethylene, from about 1 to about 25% by weight of unsaturated carboxylic acid, and from 0 to about 60% by weight of softening comonomer. Preferably the copolymer contains from about 50 to 95% by weight of ethylene, from about 5 to about 20% by weight of unsaturated carboxylic acid and from 0 to about 40% by weight of softening comonomer. Most preferably the copolymer contains from about 60 to about 95% by weight of ethylene, from about 5 to about 15% by weight of unsaturated carboxylic acid and from 0 to about 30% by weight of softening comonomer.

These ethylene/acid copolymers are blended with a thermoplastic resin or thermoplastic elastomer. The thermoplastics should be nonreactive with the aluminum ion source (i.e. the thermoplastics should have little or no acid functionality) and they should have at least a slight degree of compatibility with the ethylene acid copolymer to avoid grossly incompatible blends that are laminar.

Accordingly, the thermoplastic resin or elastomer can be polyamide (e.g. nylon 66, nylon 6, nylon 610, nylon 612, nylon 666), polyester (e.g. polyethylene terephthalate, poly tetramethylene glycol terephthalate), polyester ether (containing a crystalline phase consisting of the polyester of alkane diols having 4 to 8 carbon atoms with aromatic diacids and a soft rubbery polyether phase), block copolymer of aromatic substituted ethylenically unsaturated monomer with diolefin (e.g. styrene/butadiene and hydrogenated derivative of said copolymer), polyurethane, and polyolefin resin (e.g. polyethylene or polypropylene). Preferably the thermoplastic resin or elastomer is nylon, polyolefin or A-B-A type block copolymer of aromatic substituted ethylenically unsaturated monomer (A) with diolefin (B) and hydrogenated derivatives of said copolymers. Most preferably, the thermoplastic resin or elastomer is nylon 6, high density polyethylene or hydrogenated A-B-A block copolymer of styrene (A) with a mixture of butadiene and isoprene (B).

The amount of ethylene/acid copolymer in the blend is from about 50 to about 95% by weight, preferably from about 55 to about 90% by weight, and most preferably from about 60 to about 80% by weight. The thermoplastic resin or elastomer is present in an amount of from about 5 to about 50% by weight, preferably from about 10 to about 45% by weight, and most preferably from about 20 to about 40% by weight.

After the ethylene/acid copolymer and the thermoplastic resin or elastomer has been mixed, the blend is neutralized with an aluminum ion source, such as aluminum carboxylate, aluminum alkoxide, chelated aluminum compounds, and aluminum hydroxide, preferably aluminum acetate, aluminum isopropoxide and aluminum acetylacetonate.

Care should be taken when the thermoplastic resin or elastomer is hydrolyzable, such as polyamides, polyesters, polyester ethers or polyurethanes. When the blend of the present invention is made with such polymers it is essential that the aluminum ion source does not generate water or acid during the course of the neutralization, in order to avoid degradation of the thermoplastic resin or elastomer. Suitable aluminum ion source for such sensitive polymers are chelated aluminum compounds and mixtures of aluminum alkoxides with chelated aluminum compounds or with functional amounts of chelating agents. Preferred aluminum ion source for the sensitive polymers is aluminum acetylacetonate and aluminum dialkoxide acetoacetic ester chelate (e.g. aluminum diisopropoxide acetoacetic ester chelate) and mixtures of aluminum isopropoxide with aluminum acetylacetonate or with dialkoxide acetoacetic ester chelate or with acetylacetone or with acetoacetic ester. The most preferred aluminum ion source for the sensitive polymers is aluminum acetylacetonate and for the nonhydrolyzable polymers, such as aromatic/diolefin block copolymers and polyolefin resins it is alumina trihydrate activated with glacial acetic acid.

The extent of neutralization is from about 1 to about 100%, preferably from about 5 to about 90% and most preferably from about 10 to 85%.

The blends of ethylene/acid copolymer and thermoplastic resin or elastomer can be prepared by mixing at a temperature of from about 150° to about 300° C., preferably from about 180° C. to about 295° C. and most preferably from about 200° C. to about 290° C. the ethylene acid copolymer with the thermoplastic material and subsequently neutralizing the material with an aluminum ion source. Alternatively the mixing and neutralization can be carried out simultaneously. Production of the neat aluminum ionomer followed by mixing with the thermoplastic component is precluded by the intractability of the aluminum ionomer.

The following examples serve to illustrate the present invention. All parts, percentages and proportions are by weight unless otherwise indicated.

EXAMPLE 1

An ethylene, n-butylacrylate, methacrylic acid polymer containing 30% butyl acrylate, 5% methacrylic acid and 65% ethylene (77 grams) was placed on a roll mill with ethylene/methacrylic acid copolymer containing 1.7% methacrylic acid (14 grams) and linear ethylene/octene-1 copolymer of 0.45 g/10 min MI and 0.95 g/cm$^3$ density (about 1% by weight octene content) (7.6 grams). This material was fluxed together at 190° C. and enough aluminum acetylacetonate (Alacac) was added in order to neutralize 28% of the acid (1.4 grams). The material was milled for about 5–10 minutes and removed from the mill and molded into plaques using a compression molding device.

The composition and physical properties of these compression molded samples are summarized in Table I.

TABLE I

| | Example 1 | |
|---|---|---|
| Composition, g | 65 E/30nBA/5MAA | (77) |
| | 98.3 E/1.7 MAA | (14) |
| | ethylene copolymer[9] | (7.6) |
| | Alacac | (1.4) |
| | | 28% neutr. |
| Hardness Shore A[1] | 65 | |
| Compression Set[2] | | |
| Method B 22 hrs. @ 70° C. | 48 | |
| 85° C. | 73 | |
| Tensile Strength @ 23° C.[3] | | |
| Break | | |
| psi | 790 | |
| MPa | 5.45 | |
| % elongation | 350 | |
| Tensile Strength 100% strain | | |
| psi[3] | 500 | |
| MPa | 3.45 | |
| Tensile Set at 100% strain, % | 8 | |
| Tensile Strength @ 70° C. | | |
| psi[5] | 329 | |

TABLE I-continued

| | Example 1 | |
|---|---|---|
| MPa | 2.29 | |
| Flex Modulus[4] | psi | MPa |
| 70° C. | 500 | 3.44 |
| 50° C. | 730 | 5.03 |
| 23° C. | 1840 | 12.69 |
| −20° C. | 3640 | 25.09 |
| −30° C. | 5020 | 34.61 |
| Ross Flex @ −29° C., cycles[5] | 5000 | |
| Bashore resilience, % rebound[6] | 39 | |
| Oil Swell 100° C. ASTM No. 3[7] | 236 | |
| % Swell 70 hrs. | 236 | |
| Clash-Berg °C.[8] | −32 | |

Footnotes
[1] ASTM D2240
[2] ASTM - D395
[3] ASTM - D412
[4] ASTM - D790
[5] ASTM - D1052
[6] ASTM - D2632
[7] ASTM - D471
[8] ASTM D-1043
[9] linear ethylene/octene-1 copolymer having 0.45 MI and 0.95 density containing about 1% by weight of octene-1

EXAMPLE 2

Twenty four hundred grams of an ethylene/n-butyl acrylate/methacrylic acid copolymer (60E/28 nBA/12 MAA) and 1028 g of unextracted polycaprolactam (nylon 6) 178 g of aluminum acetylacetonate, and 255 g of N-ethyl-p-toluene sulfonamide was extrusion compounded on a Werner & Pfleiderer twin-screw extruder using the conditions indicated in Table A:

TABLE A

| | | | | Compounding Conditions | | | | | | | |
|---|---|---|---|---|---|---|---|---|---|---|---|
| | | | | Temperature °C. | | | | | | | |
| Example | RPM | Amps | Volts | Rear | Rear-Center | Center | Front-Center | Front | Die | Melt | Vacuum |
| 2 | 150 | 11 | 135 | 109 | 210 | 236 | 253 | 257 | 191 | 277 | 26.5 in.Hg (89.5 kPa) |

Plaques were produced by injection molding using a 3 oz. (85.1 g) machine under conditions indicated in Table II. The physical properties of the plaques are summarized in Table III.

TABLE II

| | | | INJECTION MOLDING CONDITIONS | | | | | | |
|---|---|---|---|---|---|---|---|---|---|
| | Temperature °C. | | | | | Boost/Inject/ | Press. | Ram | Screw Speed | Back Press. |
| Example | Rear | Center | Front | Nozzle | Mold | Hold Sec | psi (MPa) | Speed | rpm | psi (MPa) |
| 2 | 110 | 187 | 242 | 248 | 90 | 2/20/25 | 1200–1600 (8.3–11.0) | fast | 60 | 50 (0.34) |

TABLE III

| | Example 2 |
|---|---|
| Shore Hardness | 95A |
| Compression set, % @ 70° C. 22 hrs. | 55 |
| Tensile Strength at break, | |
| psi | 2800 |
| MPa | 19.31 |
| % elongation | 180 |
| Tensile Strength at break at 100° C., | |
| psi | 1400 |
| MPa | 9.65 |
| % elongation | 70 |
| NBS abrasion Index | 590 |

TABLE III-continued

| | Example 2 |
|---|---|
| Oil Swell, % 100° C. 70 hrs. | |
| ASTM No. 3 | 47 |
| ASTM No. 1 | 8.7 |
| Flex Modulus, | |
| psi | 12,200 |
| MPa | 84.1 |
| Clash-Berg °C. | −10 |

EXAMPLES 3 TO 9 AND COMPARATIVE EXAMPLE 1

The blends and plaques of the present Examples were prepared in the same manner as described in Example 2. Comparative Example 1 shows the results of the blend of a zinc ionomer and a nylon molding resin. The compositions and physical properties are summarized in Table IV.

At similar degrees of neutralization and nylon levels zinc ionomer blends give much poorer tensiles at elevated temperatures and poorer resistance to compression set.

TABLE IV

| Example | 3 | 4 | 5 | 6 |
|---|---|---|---|---|
| Ethylene Copolymer | 80E/10iBA/10MAA 35 MI | 66E/27nBA/7MAA 22 MI | 66E/27nBA/7MAA 22 MI | 66E/27nBA/7MAA |
| Ethylene Copolymer Phase, % | 65 | 65 | 65 | 65 |
| % Neutralization, (ion) | 40 (Al) | 20 (Al) | 40 (Al) | 60 (Al) |
| High Melting Thermoplastic Resin | Unextracted polycaprolactam (nylon 6), I.V. 65 | | | |
| Phase, Amount % | 35 | 35 | 35 | 35 |
| Hardness, Shore A | 90 | 80 | 80 | 85 |
| Tens. Str. @ 23° C. | | | | |
| MPa | 15.5 | 7.93 | 11.4 | 14.7 |
| psi | 2250 | 1150 | 1650 | 2125 |
| % Elongation | 120 | 240 | 260 | 130 |
| Tens. Str. @ 100° C. | | | | |
| MPa | 2.2 | 0.69 | 1.9 | 4.2 |
| psi | 320 | 100 | 280 | 610 |
| % Elongation | 50 | 110 | 35 | 50 |
| Compression Set % 70° C., Method B, 22 hrs | 80 | 69 | 64 | 66 |

| Example | 7 | 8 | 9 | C-1 |
|---|---|---|---|---|
| Ethylene Copolymer | 66E/27nBA/7MAA | 66E/27nBA/7MAA | 80E/10iBA/10MAA | 66E/27nBA/7MAA |
| Ethylene Copolymer Phase, % | 80 | 80 | 80 | 65 |
| % Neutralization, (ion) | 20 (Al) | 40 (Al) | 60 (Al) | 60 (Zn) |
| High Melting Thermoplastic Resin | Unextracted polycaprolactam (nylon 6), I.V. 65 | | | |
| Phase, Amount % | 20 | 20 | 20 | 35 |
| Hardness, Shore A | 75 | 85 | 80 | 88 |
| Ten. Str. @ 23° C. | | | | |
| MPa | 5.17 | 9.83 | 16.4 | 11.2 |
| psi | 750 | 1425 | 2375 | 1625 |
| % Elongation | 300 | 60 | 130 | 15 |
| Ten. Str. @ 100° C. | | | | |
| MPa | 0.55 | 1.9 | 5.5 | 1.4 |
| psi | 80 | 280 | 800 | 200 |
| % Elongation | 105 | 20 | 60 | 10 |
| Compression Set % 70° C., Method B, 22 hrs | 70 | 75 | 63 | 77 |

EXAMPLES 10 TO 12

The blends and plaques of the present Examples were prepared in the same manner as described in Example 1. The compositions and physical properties are summarized in Table V. The results demonstrate that aluminum ionomer blends can be produced using polypropylene, polyester ether and thermoplastic polyurethanes as the high melting thermoplastic phase.

TABLE V

| Example | 10 | 11 | 12 |
|---|---|---|---|
| Ethylene Copolymer | 66E/27nBA/7MAA 22 MI | 66E/27nBA/7MAA 22 MI | 66E/27nBA/7MAA 22 MI |
| Ethylene Copolymer Phase, % | 70 | 70 | 70 |
| % Neutralization with Aluminum ions | 65 | 65 | 68 |
| High Melting Thermoplastic Phase (%) | polypropylene[1] (30) | polyester ether[2] (30) | thermoplastic polyurethane[3] (30) |
| Hardness, Shore D | 40 | 32 | 35 |

TABLE V-continued

| Example | 10 | 11 | 12 |
|---|---|---|---|
| Tensile Str. @ 23° C. | | | |
| MPa | 13.8 | 10.3 | 8.62 |
| psi | 2000 | 1500 | 1250 |
| % elongation | 415 | 180 | 90 |
| Tensile Str. @ 100° C. | | | |
| MPa | 3.4 | 2.2 | 2.2 |
| psi | 500 | 320 | 320 |
| % elongation | 200 | 15 | 30 |
| Compression Set % @ 70° C. 20 hrs. | 70 | 57 | 66 |

Footnotes
[1] homopolymer of propylene, density 0.902 g/cm$^3$, M.I. 0.4 g/10 min at 220° C.
[2] polyester ether containing a crystalline phase consisting of the polyester of 1,4-butanediol with terephthalic acid and a soft rubbery polytetramethylene ether glycol phase
[3] polyurethane containing a crystalline phase consisting of the addition product of 4,4'-diphenyl methane diisocyanate with 1,4-butanediol and a soft rubbery phase consisting of the polyester of 1,4-butanediol with adipic acid

EXAMPLES 13 TO 18

The blends and plaques of the present Examples were prepared in the same manner as described in Example 2. The compositions and physical properties are summarized in Table VI. The data indicate that at low degrees of neutralization tensile properties and elongation are superior. At lower nylon levels high temperature properties are inferior.

TABLE VI

| Example | 13 | 14 | 15 |
|---|---|---|---|
| Ethylene Copolymer | 65E/25nBA/10MAA | 65E/25nBA/10MAA | 65E/25nBA/10MAA |
| amount, % | 65 | 65 | 65 |
| Nylon 6, % | 28 | 28 | 28 |
| N—ethyl-p-toluene sulfonamide, % | 7 | 7 | 7 |
| % Neutralization with Aluminum ions | 23 | 46 | 66 |
| Ten. Str. Break @23° C. | | | |
| MPa | 15.9 | 13.8 | 12.4 |
| psi | 2300 | 2000 | 1800 |
| % elong. | 260 | 100 | 50 |
| Ten. Str. Break @100° C. | | | |
| MPa | 4.5 | 3.6 | 3.8 |
| psi | 660 | 520 | 550 |
| % elong. | 90 | 45 | 20 |
| Clash Berg, °C. | −8 | −9 | −10 |
| Sag test @ 121° C. cm deflection | 0 | 0 | 0 |

| Example | 16 | 17 | 18 |
|---|---|---|---|
| Ethylene Copolymer | 66E/27nBA/7MAA | 66E/27nBA/7MAA | 66E/27nBA/7MAA |
| amount, % | 65 | 68.7 | 70.3 |
| Nylon 6, % | 28 | 24 | 22 |
| N—ethyl-p-toluene sulfonamide, % | 7 | 7.3 | 7.7 |
| % Neutralization with Aluminum ions | 49 | 49 | 49 |
| Ten. Str. Break @ 23° C. | | | |
| MPa | 8.61 | 7.58 | 6.89 |
| psi | 1250 | 1100 | 1000 |
| % elong. | 30 | 20 | 20 |
| Ten. Str. Break @ 100° C. | | | |
| MPa | 3.3 | 4.1 | 2.1 |
| psi | 480 | 600 | 300 |
| % elong. | 20 | 20 | 20 |
| Clash Berg, °C. | — | — | — |
| Sag test @ 121° C. cm deflection | 0 | 0 | 0.5 |

I claim:

1. Process for preparing melt processible blend of aluminum ionomer and thermoplastic resin or elastomer by (A) mixing at from about 150° to about 300° C.
  (a) from about 50 to about 95% by weight of direct or graph copolymer of ethylene, alpha,beta-ethylenically unsaturated carboxylic acid having from 3 to 8 carbon atoms, and softening comonomer selected from the group consisting of vinyl esters of aliphatic carboxylic acids wherein the acids have 2 to 10 carbon atoms, vinyl ethers wherein the alkyl group contains 1 to 10 carbon atoms, and alkyl acrylates or methacrylates wherein the alkyl group contains 1 to 10 carbon atoms, and wherein the ethylene content of the copolymer is from about 30 to about 98 weight percent, the carboxylic acid content is from about 1 to about 25 weight percent and the softening comonomer content is from 0 to about 60 weight percent, and
  (b) from about 5 to about 50% by weight of at least one thermoplastic resin or thermoplastic elastomer selected from the group consisting of polyamide, polyester, polyester ether, block copolymer of aromatic substituted ethylenically unsaturated monomer with diolefin and hydrogenated derivative of said copolymer, polyurethane, and polyolefin resin which thermoplastic resin or thermoplastic elastomer is nonreactive with the aluminum ion source, and
(B) subsequent to or simultaneously with said mixing neutralizing from about 1 to about 100% of the carboxylic acid groups with an aluminum ion source provided, however that when the thermoplastic resin or thermoplastic elastomer is polyamide, polyester, polyester ether or polyurethane the aluminum ion source is selected from the group consisting of (1) chelated aluminum compound and (2) mixture of aluminum alkoxide with chelated aluminum compound or with chelating agent.

2. The process of claim 1 wherein the aluminum ion source is selected from the group consisting of aluminum carboxylate, aluminum alkoxide, aluminum hydroxide, chelated aluminum compound and mixture of aluminum alkoxide with chelated aluminum compound or with chelating agent.

3. The process of claim 2 wherein the aluminum ion source is selected from the group consisting of aluminum acetate, aluminum isopropoxide, activated alumina trihydrate, aluminum acetylacetonate and aluminum dialkoxide acetoacetic ester chelate and mixtures of aluminum isopropoxide with an agent selected from the group consisting of aluminum acetylacetonate, dialkoxide acetoacetic ester chelate, acetylacetone and acetoacetic ester.

4. The process of claim 2 wherein the blend contains from about 55 to about 90 weight percent of ethylene/carboxylic acid/softening comonomer copolymer and from about 10 to about 45 weight percent of thermoplastic resin or thermoplastic elastomer.

5. The process of claim 2 wherein the ethylene/carboxylic acid/softening comonomer copolymer contains from about 50 to about 95 weight percent of ethylene, from about 5 to about 20 weight percent of carboxylic acid and from about 0 to about 40 weight percent of softening comonomer.

6. The process of claim 2 wherein the unsaturated carboxylic acid is selected from the group consisting of acrylic acid, methacrylic acid, maleic acid, fumaric acid, itaconic acid, and half esters of maleic, fumaric and itaconic acids.

7. The process of claim 2 wherein the softening comonomer is selected from the group consisting of alkyl acrylates, alkyl methacrylates and alkyl vinyl ethers.

8. The process of claim 2 wherein the thermoplastic resin or thermoplastic elastomer is selected from the group consisting of nylon 66, nylon 6, nylon 610, nylon 612, nylon 666, polyethylene terephthalate, polytetramethylene glycol terephthalate, A-B-A type block copolymers of aromatic substituted ethylenically unsaturated monomer (A) with diolefin (B) and hydrogenated derivatives of said copolymers, and polyolefins.

9. The process of claim 2 wherein from about 5 to about 90% of the carboxylic acid groups of the ethylene copolymer is neutralized.

10. The process of claim 2 wherein the mixing is carried out at a temperature of from about 180° to about 295° C.

11. The process of claim 3 wherein
the ethylene/carboxylic acid/softening comonomer copolymer contains from about 50 to about 95 weight percent of ethylene, from about 5 to about 20 weight percent of carboxylic acid and from 0 to about 40 weight percent of softening comonomer;
the unsaturated carboxylic acid is selected from the group consisting of acrylic acid, methacrylic acid, maleic acid, fumaric acid, itaconic acid, and half esters of maleic, fumaric and itaconic acids;
the softening comonomer is selected from the group consisting of alkyl acrylates, alkyl methacrylates and alkyl vinyl ethers;
the thermoplastic resin or thermoplastic elastomer is selected from the group consisting of nylon 66, nylon 6, nylon 610, nylon 612, nylon 666, polyethylene terephthalate, polytetramethylene glycol terephthalate, A-B-A type block copolymers of aromatic substituted ethylenically unsaturated monomer (A) with diolefin (B) and hydrogenated derivatives of said copolymers, and polyolefins;
from about 5 to about 90% of the carboxylic acid groups of the ethylene copolymer is neutralized; and
the mixing is carried out at a temperature of from about 180° to about 295° C.

12. The process of claim 3 wherein the ethylene/carboxylic acid/softening comonomer copolymer contains from about 60 to about 95 weight percent of ethylene, from about 5 to about 15 weight percent of carboxylic acid and from 0 to about 30 weight percent of softening comonomer.

13. The process of claim 3 wherein the unsaturated carboxylic acid is selected from the group consisting of methacrylic acid.

14. The process of claim 3 wherein the softening comonomer is butyl acrylate.

15. The process of claim 3 wherein the thermoplastic resin or thermoplastic elastomer is selected from the group consisting of nylon 6, polyethylene and hydrogenated A-B-A block copolymer of styrene (A) with a mixture of butadiene and isoprene (B).

16. The process of claim 3 wherein from about 10 to about 85% of the carboxylic acid groups of the ethylene copolymer is neutralized.

17. The process of claim 3 wherein the aluminum ion source is selected from the group consisting of aluminum acetylacetonate and alumina trihydrate activated with glacial acetic acid.

18. The process of claim 3 wherein the mixing is carried out at a temperature of from about 200° to about 290° C.

19. The process of claim 12 wherein
the ethylene/carboxylic acid/softening comonomer copolymer contains from about 60 to about 95 weight percent of ethylene, from about 5 to about 15 weight percent of carboxylic acid and from 0 to about 30 weight percent of softening comonomer;
the unsaturated carboxylic acid is selected from the group consisting of methacrylic acid;
the softening comonomer is selected from the group consisting of butyl acrylate;
the thermoplastic resin or thermoplastic elastomer is selected from the group consisting of nylon 6, polyethylene and hydrogenated A-B-A block copolymer of styrene (A) with a mixture of butadiene and isoprene (B);
from about 10 to about 85% of the carboxylic acid groups of the ethylene copolymer is neutralized;
the aluminum ion source is selected from the group consisting of aluminum acetylacetonate and alumina trihydrate activated with glacial acetic acid; and
the mixing is carried out at a temperature of from about 200° to about 290° C.

* * * * *